US011987481B2

(12) United States Patent
Babinchak

(10) Patent No.: US 11,987,481 B2
(45) Date of Patent: May 21, 2024

(54) HOIST ATTACHMENT FOR A FORKLIFT TRUCK

(71) Applicant: Lift-All Company, Inc., Landisville, PA (US)

(72) Inventor: Gregory S. Babinchak, Elizabethtown, PA (US)

(73) Assignee: LIFT-ALL COMPANY, INC., Landisville, PA (US)

(*) Notice: Subject to any disclaimer, the term of this patent is extended or adjusted under 35 U.S.C. 154(b) by 926 days.

(21) Appl. No.: 17/014,617

(22) Filed: Sep. 8, 2020

(65) Prior Publication Data

US 2022/0073327 A1 Mar. 10, 2022

(51) Int. Cl.
*B66F 9/075* (2006.01)

(52) U.S. Cl.
CPC .......... *B66F 9/075* (2013.01); *B66F 2700/09* (2013.01)

(58) Field of Classification Search
CPC ... B66C 1/125; B66C 1/14; B66C 1/18; B66F 9/07504; B66F 9/12; B66F 9/127; B66F 9/18
See application file for complete search history.

(56) References Cited

U.S. PATENT DOCUMENTS

| | | | | |
|---|---|---|---|---|
| 3,273,931 A * | 9/1966 | Caldwell | B66F 9/184 | 294/81.2 |
| 4,073,175 A * | 2/1978 | Seamon | B66F 9/187 | 294/82.11 |
| 4,454,683 A * | 6/1984 | Schauer | A01G 23/043 | 47/76 |
| 5,056,982 A * | 10/1991 | Stockham | B66F 9/18 | 414/607 |
| 6,371,543 B1 * | 4/2002 | Fujikawa | B66C 1/625 | 294/82.11 |
| 9,828,224 B1 * | 11/2017 | Hamilton | B66F 9/12 | |
| 10,301,157 B1 * | 5/2019 | Kramer | B66F 9/18 | |
| 2004/0108738 A1 * | 6/2004 | Marry | B66F 9/18 | 414/785 |
| 2008/0315604 A1 * | 12/2008 | Fredriksson | B66C 1/125 | 294/74 |
| 2011/0038696 A1 * | 2/2011 | Ummel, Jr. | B65F 3/04 | 414/408 |

* cited by examiner

*Primary Examiner* — Tyrone V Hall, Jr.
(74) *Attorney, Agent, or Firm* — Potomac Law Group, PLLC

(57) ABSTRACT

A hoist attachment which includes a base member; a positioning guide extending from the base member; a positioning member; and an endless sling. The endless sling extends from the base member and cooperates with the positioning guide, the positioning member and the hook member. The hoist attachment remains in position when lifting a load but is easily adjustable when no load is applied. The hoist attachment may be used with the forks of a forklift truck.

20 Claims, 6 Drawing Sheets

HOIST ATTACHMENT FOR A FORKLIFT TRUCK

FIELD OF THE INVENTION

The present invention is directed a self-gripping hoist attachment which tightens around a support member when a load is applied. In particular, the invention is directed to an attachment for a forklift truck which facilitates overhead lifting by the fork truck.

BACKGROUND OF THE INVENTION

While forklift trucks are ideally designed for lifting objects which have been placed on a wooden pallet or the like, they are not well equipped to move odd-shaped object. Such odd-shaped, heavy, and cumbersome objects in and around warehouses, construction sites, and docks are frequently moved about by means of a rope, strap, or cable sling connected to, or positioned under, the object (or "load") being moved and the sling and load are lifted by placing the sling over the tine of the forklift truck. Sometimes more than one sling is used, and both tines of the forklift truck may be used to carry the load, either with one sling positioned over both tines, or one or more slings carried by each tine.

While the tines of most forklift trucks are adjustable to angle the tine(s) slightly upward from rear (near the forklift truck body or frame) to front (the open end(s) of the tine(s)) to hinder slippage of the sling off the front of the tine, it usually is preferable to have the sling(s) positioned somewhat forward on the tine(s) so as to keep the load away from the frame of the forklift truck and to allow positioning the load during movement and at placement. Essentially, it is friction alone that resists slippage of the sling on the tine. In addition, the tines usually are sufficiently rectangular in cross-section that at least two fairly sharp (90-degree angle with a slight rounded corner) edges of the tine are in contact with the sling. This can result in wear, tearing, cuts, and/or breakage of the sling, a condition aggravated by any damage (nicks, scrapes, cuts) to or roughness in the tine and any movement of the sling along the tine under load.

It would, therefore, be beneficial to provide a solution which minimizes the shortcomings of the prior art and conventional practice as described above by providing for a secure self-gripping hoist attachment which, when positioned on the forklift truck tine, secures the hoist attachment from slipping while protecting the hoist attachment and the sling from being cut, torn, or worn by the sharper edges of the forklift truck tines.

SUMMARY OF THE INVENTION

An object of the invention is to provide a hoist attachment for a forklift truck or other device which can be easily attached to the tines or support members and which can be positioned as needed.

An object of the invention is to provide a hoist attachment which remains in position when lifting the load, but which is easily adjustable when no load is applied.

An object of the invention is to provide a hoist attachment which is subject to minimal cuts, tears or wear when position on the tines or support member and when lifting the load.

An embodiment is directed to a hoist attachment which includes a base member; a positioning guide extending from the base member; a positioning member; and an endless sling. The endless sling extends from the base member and cooperates with the positioning guide, the positioning member and the hook member.

The positioning guide has positioning loops which extend from either side of mounting portions of the positioning guide. The positioning loops are positioned proximate to, but spaced from, the sling protection portions of the protection pads. Sling protection portions of the protection pads are positioned between the positioning loops and a longitudinal axis of the hoist attachment.

The endless sling extends from either side of the base member. Each side of the endless sling extends from the base member through the positioning member. A first portion of the endless sling that extends between the base member and the positioning member is guided by the sling protection portions of the protection pads. A second portion of each side of the endless sling then extends from the positioning member to and around the positioning loops of the positioning guide. A third portion of each side of the endless sling extends from the positioning loops to a load mounting portion of the endless sling.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
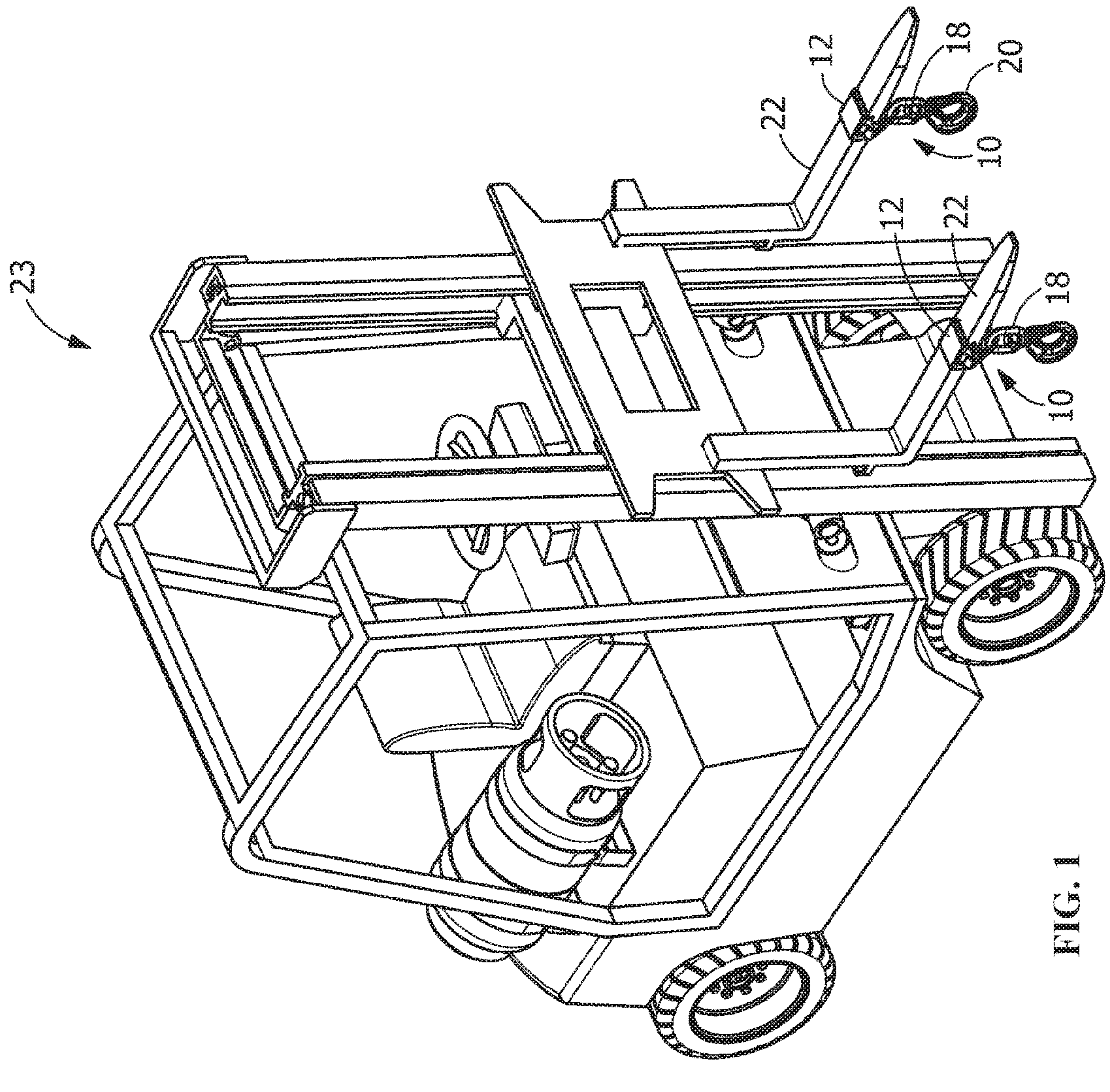
FIG. 1 is a perspective view of a forklift truck with several hoist attachments of the present invention provided thereon.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the preferred embodiments. Accordingly, the invention expressly should not be limited to such embodiments illustrating some possible non-limiting combination of features that may exist alone or in other combinations of features, the scope of the invention being defined by the claims appended hereto.

Figure 6:
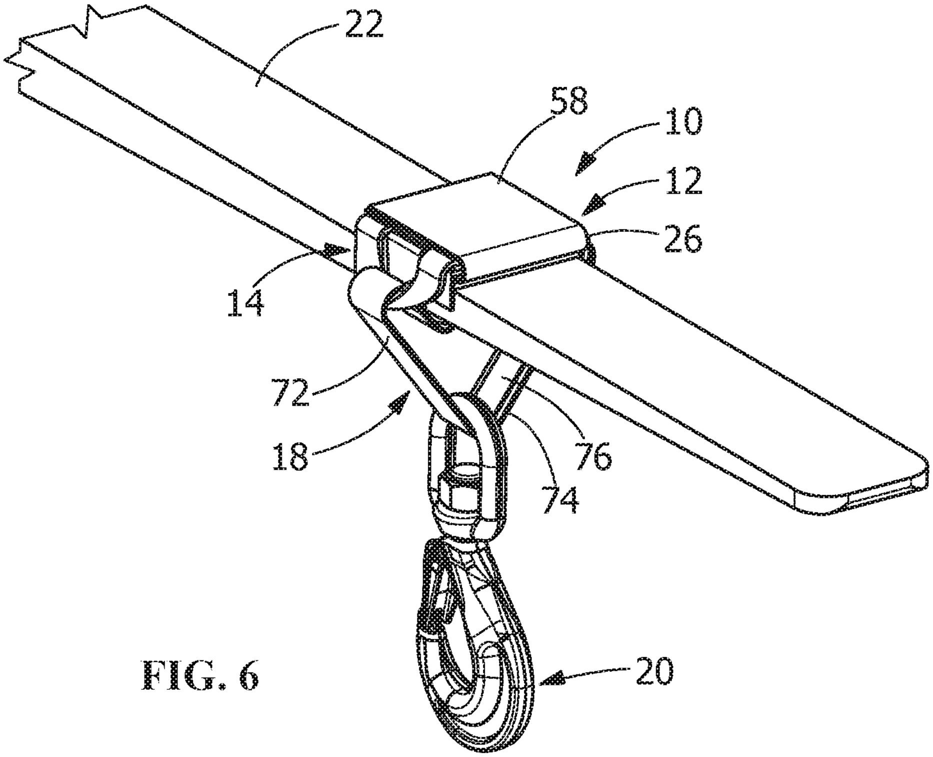
FIG. 6 is a perspective view of the hoist attachment of FIG. 2 positioned on a fork of a forklift truck prior to a load being applied to the hoist attachment.
Figure 7:
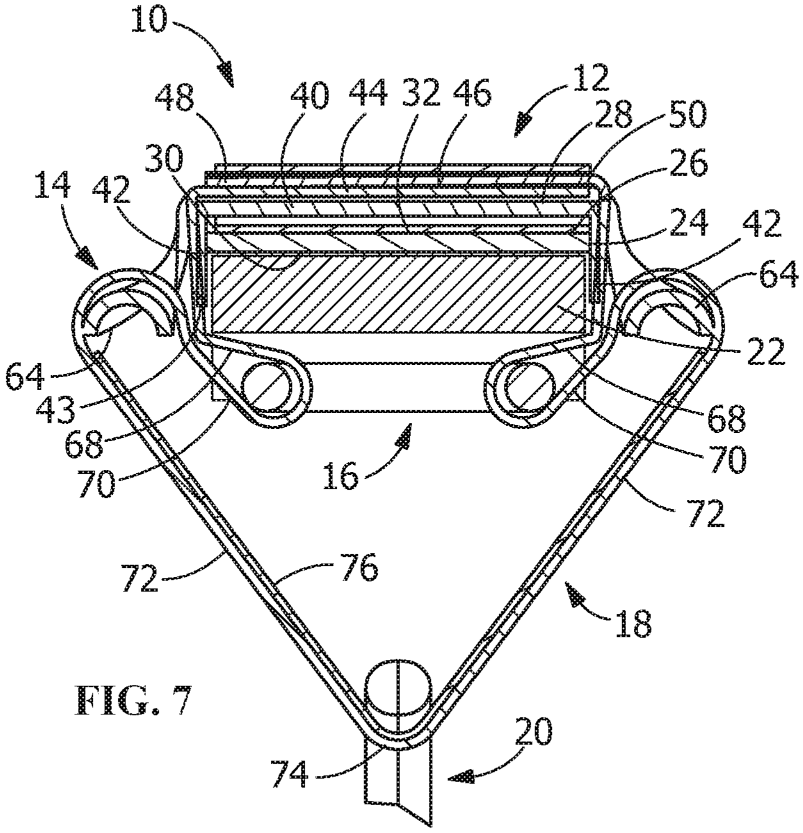
FIG. 7 is a cross-sectional view of the hoist attachment and fork taken along line 7-7 of FIG. 6.
Figure 8:
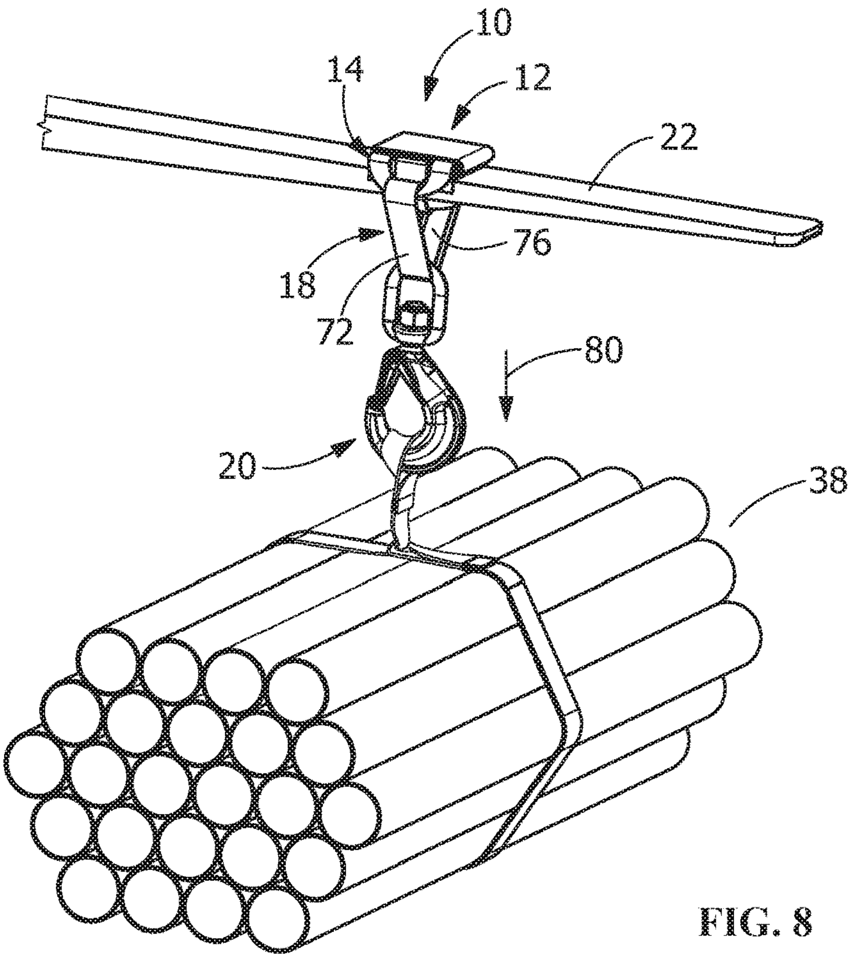
FIG. 8 is a perspective view of the hoist attachment of FIG. 2 positioned on the fork of a forklift truck with a load extending from the hoist attachment.
Figure 9:
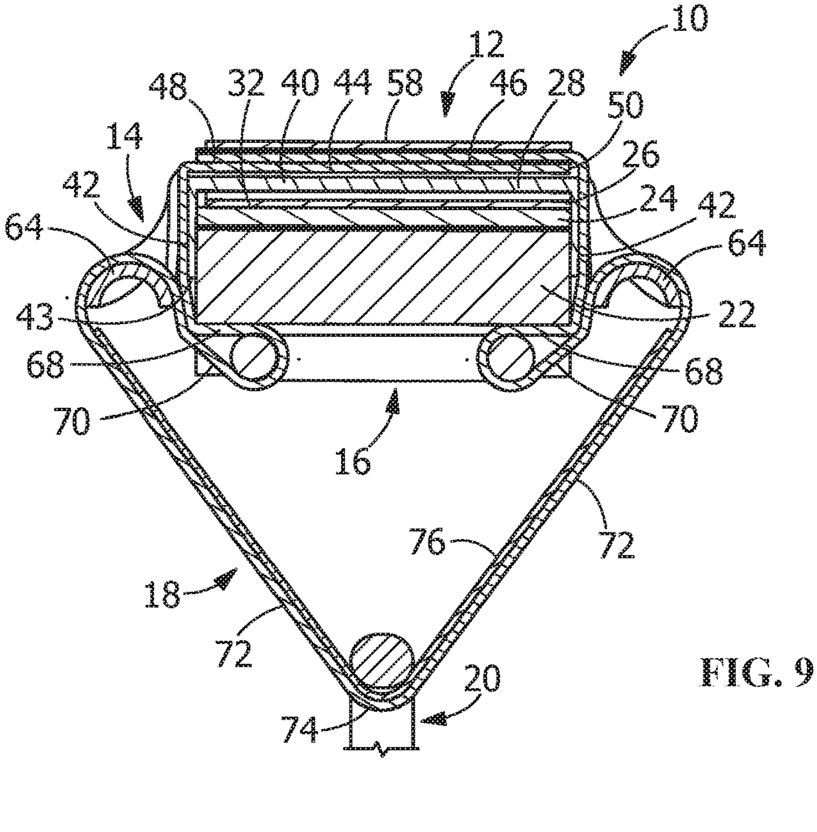
FIG. 9 is a cross-sectional view of the hoist attachment and fork taken along line 9-9 of FIG. 8.

As shown in FIGS. 2 through 5, a hoist attachment 10 has a base member 12, a positioning guide 14, a positioning member 16, an endless sling 18 and connection hardware 20. The hoist attachment 10 is configured to be positioned on a tine or fork 22 of a forklift truck 23, as shown in FIGS. 1, 6 through 9, to allow the fork 22 to act as a hoist and lift loads, as illustrated in FIG. 8. Although the hoist attachment 10 is shown with a fork 22 in the illustrative embodiment, the hoist attachment 10 may be used with other types of devices or lifting mechanisms. In addition, while the connection hardware 20 is shown as a hook member 20, other types of connection hardware or no connection hardware may be used.

Figure 4:
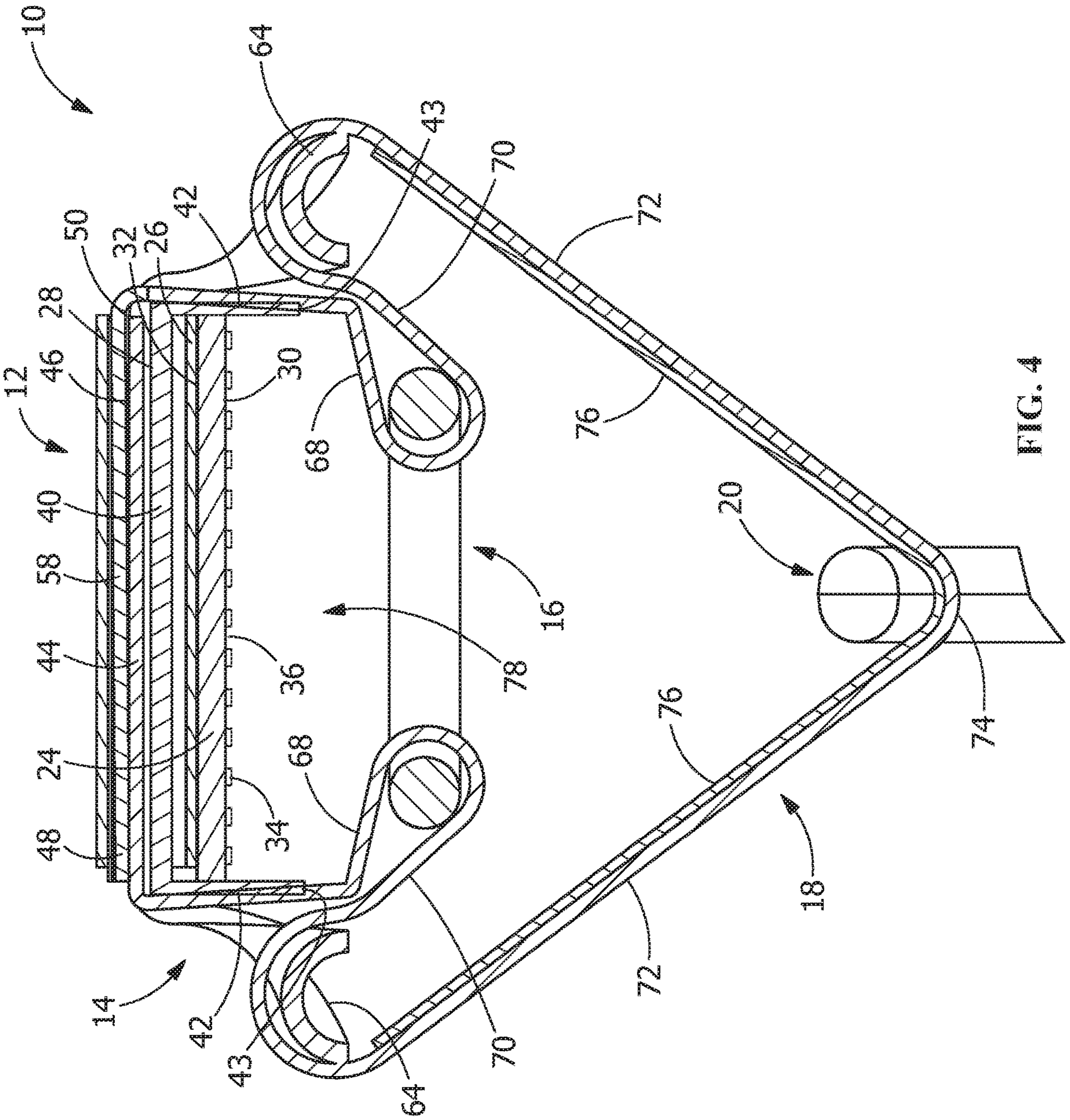
FIG. 4 is an enlarged cross-sectional view of the hoist attachment taken along line 4-4 of FIG. 2.
Figure 5:
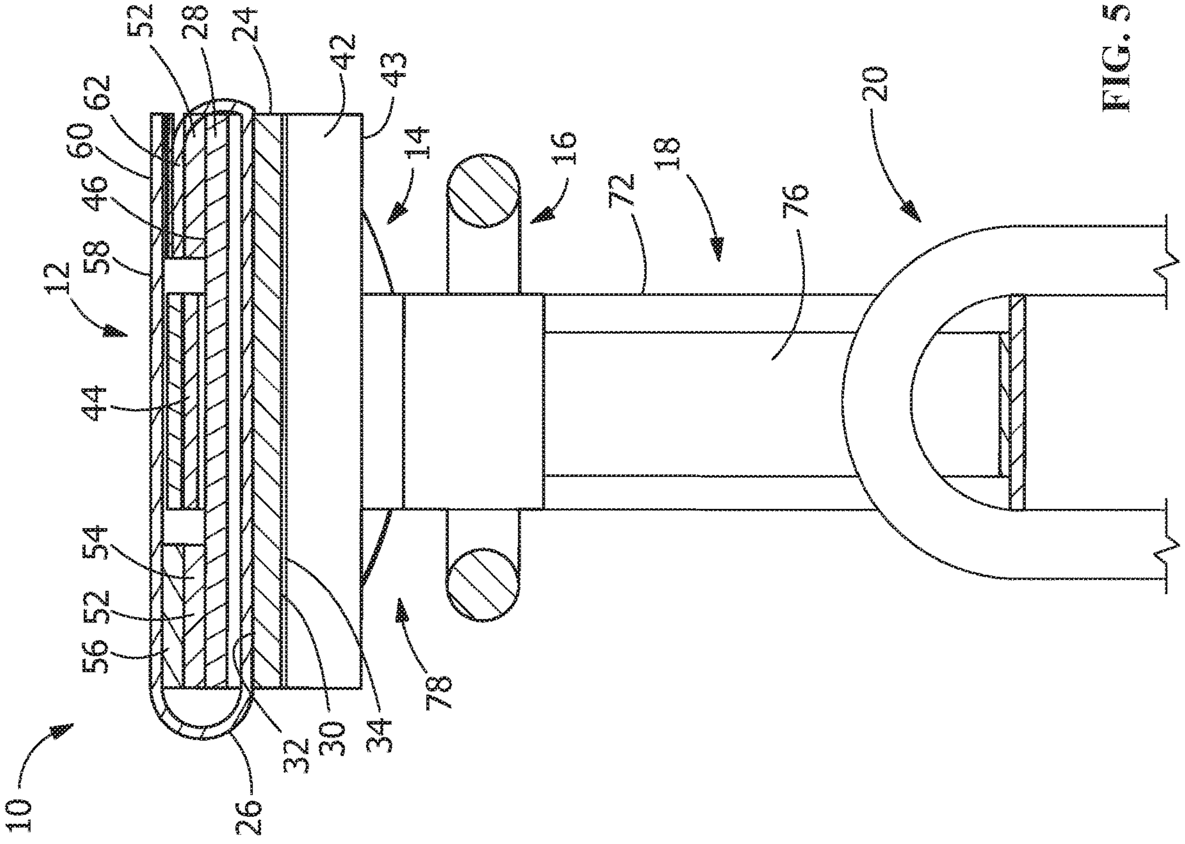
FIG. 5 is an enlarged cross-sectional view of the hoist attachment taken along line 5-5 of FIG. 2.

As shown in FIGS. 4 and 5, the base member 12 has a gripping pad or belt 24, a wrap 26 and a protection or strengthening pad or belt 28. Portions of the positioning guide 14 and the sling 18 extend through the base member 12.

The gripping pad 24 has a first surface 30 and an oppositely facing second surface 32. In the illustrative embodiment shown, the first surface 30 has projections 34 and recesses 36 to form a surface which can compress against the fork 22 which the hoist attachment 10 is positioned on the fork 22 and a load 38 (FIG. 8) is attached to the hook member 20. Other configurations of the first surface 30 may be used without departing from the scope of the invention. In addition, various coatings, such as, but not limited to nonslip coatings, may be applied to first surface 30 to allow the first surface 30 and the hoist attachment 10 to remain in position on the fork 22.

A bottom portion of the wrap 26 is attached to the second surface 32 of the gripping pad 24. The bottom portion of the wrap 26 can be stitched to the second surface 32 of the gripping pad 24 to retain the wrap 26 in position relative to the gripping pad 24. In other illustrative embodiments, the wrap 26 may be secured to the gripping pad 24 by other known methods or devices, such as, but not limited to, hook and loop fasteners or adhesives.

The protection or strengthening pad or belt 28 is then layered on top of the bottom portion of the wrap 26. The protection pad 28 has a mounting portion 40 and sling protection portions 42 which extend from opposed ends of the mounting portion 40. The mounting portion 40 is dimensioned to be approximate the same length and width as the gripping pad 24. The mounting portion 40 can be stitched to the bottom portion of the wrap 26 and/or to the second surface 32 of the gripping pad 24 to retain the mounting portion 40 in position relative to the gripping pad 24. In other illustrative embodiments, the mounting portion 40 may be secured by other known methods or devices, such as, but not limited to, hook and loop fasteners or adhesives.

The sling protection portions 42 extend from the mounting portion 40 and are bent in a direction toward the positioning member 16. In this position, the sling protection portions 42 extend beyond the bottom portion of the wrap 26 and the gripping pad 24, wherein free ends 43 of the sling protection portions 42 are positioned closer to positioning member 16 than the gripping pad.

The protection pad 28 may be made from two or more pieces or plies of fabric or webbing to provide the protection and strength characteristics desired. Alternatively, the protection pad 28 may be folded to provide the protection and strength characteristics desired.

A mounting portion 44 of the sling 18 is positioned on a first or upper surface 46 of the mounting portion 40 of the protection pad 28. In the illustrative embodiment shown, ends 48, 50 of the sling 18 overlap and are secured together, for example by stitching, to form the mounting portion 44. The mounting portion 44 of the sling 18 can be stitched to the upper surface 46 of mounting portion 40 of the protection pad 28 to retain the mounting portion 44 and the sling 18 in position relative to the protection pad 28 and the base member 12. In other illustrative embodiments, the mounting portion 44 may be secured by other known methods or devices, such as, but not limited to, hook and loop fasteners or adhesives.

In the illustrative embodiment shown, the positioning guide 14 is a sling, however, other types of positioning guides may be used. Mounting portions 52 of the positioning guide 14 are also positioned on the first or upper surface 46 of the mounting portion 40 of the protection pad 28. The mounting portions 52 of the positioning guide 14 are positioned to either side of the mounting portion of the sling 18. In the illustrative embodiment shown, ends 54, 56 of the positioning guide 14 overlap and are secured together, for example by stitching, in the mounting portion 52. The mounting portion 52 of the positioning guide 14 can be stitched to the upper surface 46 of mounting portion 40 of the protection pad 28 to retain the mounting portion 52 and the positioning guide 14 in position relative to the protection pad 28 and the base member 12. In other illustrative embodiments, the mounting portion 52 may be secured by other known methods or devices, such as, but not limited to, hook and loop fasteners or adhesives.

A cover portion 58 of the wrap 26 is positioned over the mounting portion 44 of the sling 18 and the mounting portions 52 of the positioning guide 14. Free ends 60, 62 of the wrap 26 overlap to form part of the cover portion 58. The free ends 60, 62 have fasteners, such as, but not limited to hook and loop fasteners, to retain the cover portion 58 in a closed position as desired.

Figure 2:
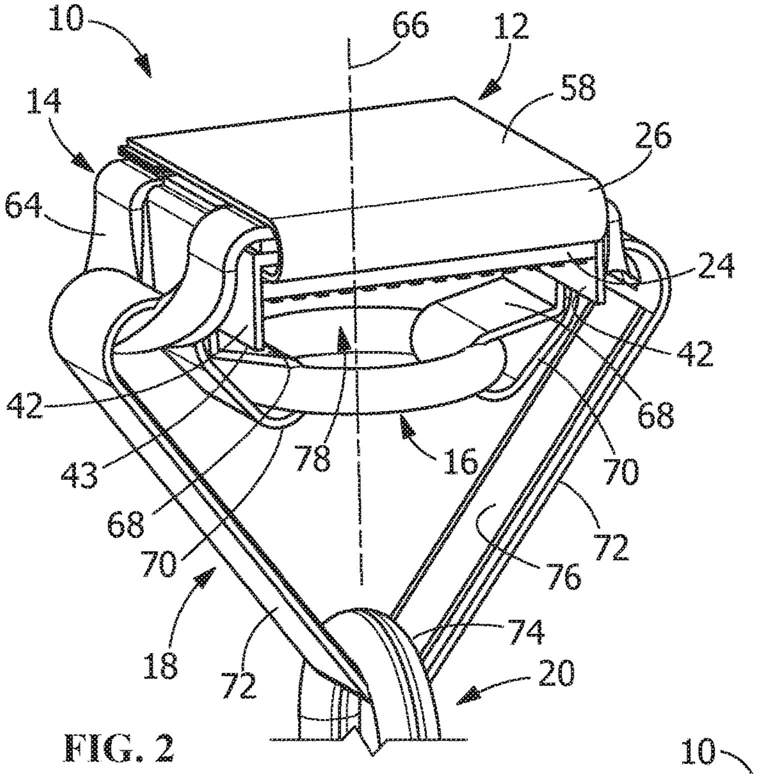
FIG. 2 is a top side perspective view of an illustrative embodiment of a hoist attachment of the present invention.
Figure 3:
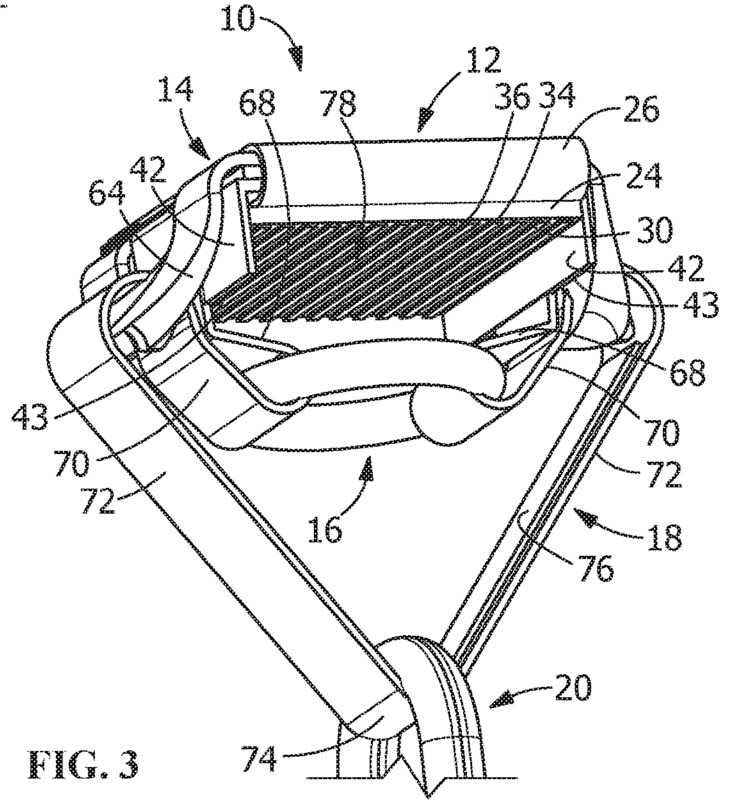
FIG. 3 is a bottom side perspective view of the hoist attachment of FIG. 2.

As shown in FIG. 2 through 4, the positioning guide 14 has positioning loops 64 which extend from either side of the mounting portions 52 and either side of the base member 12. The positioning loops 64 are positioned proximate to, but spaced from, the sling protection portions 42 of the protection pads 28. The sling protection portions 42 of the protection pads 28 are positioned between the positioning loops 64 and the longitudinal axis 66 of the hoist attachment, as shown in FIG. 4.

The sling 18 extends from either side of the mounting portions 44 and from either side of the base member 12. Each side of the sling 18 extends from the base member 12 through the positioning member 16. The portion 68 of the sling 18 that extends between the base member 12 and the positioning member 16 is guided by the sling protection portions 42 of the protection pads 28. In the embodiment shown, the positioning member 16 is a circular member made from metal. However, other configurations and materials for the positioning member 16 may be used.

A portion 70 of each side of the sling 18 then extends from the positioning member 16 to and around the positioning loops 64 of the positioning guide 14. A portion 72 of each side of the sling 18 extends from the positioning loops 64 to the load mounting portion 74 of the sling 18. While the sling 18 has been described has having different portions, the portions 68, 70, 72 and 74 are all portions of the continuous sling 18.

Portions 72, 74 of the sling 18 may also include a lining or wear pad 76. The wear pad 76 provides increased strength to the portions 72, 74 and provides increased resistance to wear of the sling 18 caused by the movement of the hook member 20 or the sling engaging the fork 22 of a forklift truck 23.

In the illustrative embodiment shown, the connection hardware or hook member 20 is a swivel type hook. However, other types of connection hardware, such as, but not limited to, rings, triangles, shackles or other types of hooks can be used.

In operation, the hoist attachment 10 is positioned on the fork 22 of the Forklift truck 23. As shown in FIGS. 6 and 7, the fork 22 is positioned in a fork receiving area 78 which is defined on the bottom by the positioning member 16 and on the top by the first surface 30 of the gripping pad 24. The fork receiving area 78 is also defined on either side by the sling protection portions 42 of the protection pad 28 and the portions 72 of the sling 18. When the hoist attachment 10 is initially positioned on the fork 22, no weight is applied to the hook member 20. As no weight is applied to the hook member 20, the sling 18 and other components of the hoist attachment 10 are in an unstressed state. In the unstressed state, the fork receiving area 78 is configured to be larger than the fork 22, thereby allowing for the easy insertion and movement of the hoist attachment 10 relative to the fork 22.

The configuration of the fork receiving area 78 in the unstressed state is facilitated by the routing of the sling 18 through the positioning loops 64 of the positioning guide 14. When no weight is provided on the hook member 20, the positioning loops 64 of the positioning guide 14 maintain the portions 72 of the sling 18 away from the sling protection portions 42 of the protection pad 28, allowing the portions 72 of the sling 18 and to be maintained in a position in which the distance between the portions 72 of the sling 18 and the distance between the sling protection portions 42 of the protection pad 28 is greater than the width of the fork 22. In addition, in the unstressed state, the distance between the positioning member 16 and the first surface 30 of the gripping pad 24 is greater than height or thickness of the fork 22.

When the hoist attachment 10 is properly positioned, a load 38 may be attached to the hook member 20. As the fork 22 is lifted, the load 38 applies a downward force 80 to the hook member 20 and to the hoist attachment 10. The downward force causes the load mounting portion 74 of the sling 18 to move downward, which in turn causes the sling 18 to be in a stressed state. As this occurs, forces are transferred through the portions 72 of the sling 18 to portions 70 and to portions 68 of the sling 18. The downward movement of the portions 72 causes the portions 70 to act upon the positioning loops 64 of the positioning guide 14, causing the portions 70 to move inward toward the longitudinal axis 66 of the hoist attachment. This in turn causes the portions 68 of the sling 18 to move inward toward the longitudinal axis 66 of the hoist attachment. As the portions 68 of the sling 18 are moved inward, the portions 68 engage the sling protection portions 42 of the protection pad 28 causing the sling protection portions 42 to move inward. The inward motion causes the portions 68 of the sling 18 and the sling protection portions 42 of the protection pad 28 to be moved into engagement with the fork 22.

Once the sling protection portions 42 engage the fork 22 further inward movement portions 68 of the sling 18 and the sling protection portions 42 of the protection pad 28 is prevented. Consequently, further lifting of the load 38 causes the portions 68 of the sling 18 and the sling protection portions 42 of the protection pad 28 to exert a force on the fork 22, thereby preventing the fork attachment 10 from moving relative to the fork 22. The use of the sling protection portions 42 of the protection pad 28 provides increased resistance to wear of the sling 18 caused by the relative movement of the portions 68 of the sling 18 and the fork 22 of a Forklift truck 23.

In addition, the movement of the portions 70, 68 of the sling 18 interact with the positioning member 16, causing the positioning member 16 to move upward toward the first surface 30 of the gripping pad 24. With the sling 18 in the stressed state, the downward movement of the sling 18 causes the effective length of the portions 68 to be shortened, which in turn causes the positioning member 16 to be moved toward the first surface 30 of the gripping pad 24. As the positioning member 16 is moved upward, the portions 68 of the sling 18 and the positioning member 16 are moved into engagement the fork 22.

Once the portions 68 of the sling 18 and the positioning member 16 engage the fork 22 further upward movement of the portions 68 of the sling 18 and the positioning member 16 and the sling protection portions 42 of the protection pad 28 is prevented. In this position, the first surface 30 of the gripping pad 24 is also maintained in position on the fork. Consequently, further lifting of the load 38 causes the portions 68 of the sling 18, the positioning member 16 and the first surface 30 of the gripping pad 24 to exert a force on the fork 22, thereby preventing the fork attachment 10 from moving relative to the fork 22.

The hoist attachment 10 is easy to position on a fork of a forklift truck or other such device. The configuration of the hoist attachment 10 allows the hoist attachment 10 to self-tighten and self-grip around the fork when is load is applied, without the need for tooling, thereby converting the forklift truck into a hoist device.

While the invention has been described with reference to a preferred embodiment, it will be understood by those skilled in the art that various changes may be made and equivalents may be substituted for elements thereof without departing from the spirit and scope of the invention as defined in the accompanying claims. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A hoist attachment comprising:

a base member;

a positioning guide extending from the base member;

positioning loops extending from each end of the base member, the positioning loops positioned exterior to the positioning guide;

a positioning member;

an endless sling feeding around and extending through the positioning loops, the endless sling having a load mounting portion, the endless sling cooperating with the positioning guide and the positioning member.

2. The hoist attachment as recited in claim 1, wherein the base member has a gripping pad with a first surface and an oppositely facing second surface.

3. The hoist attachment as recited in claim 2, wherein the first surface has projections and recesses.

4. The hoist attachment as recited in claim 2, wherein the first surface has a nonslip coating applied thereto.

5. The hoist attachment as recited in claim 2, wherein the base member has a protection pad which is layered directly or indirectly on the gripping pad, the protection pad has a mounting portion and sling protection portions which extend from opposed ends of the mounting portion.

6. The hoist attachment as recited in claim 5, wherein the sling protection portions extend from the mounting portion of the protection pad and are bent in a direction toward the positioning member, wherein the sling protection portions extend beyond the gripping pad.

7. The hoist attachment as recited in claim 6, wherein the protection pad is made from two or more pieces or plies of fabric or webbing.

8. The hoist attachment as recited in claim 6, wherein a mounting portion of the endless sling is positioned on a first surface of the mounting portion of the protection pad.

9. The hoist attachment as recited in claim 8, wherein mounting portions of the positioning guide are positioned on either side of the mounting portion of the endless sling.

10. The hoist attachment as recited in claim 9, wherein the base member has a wrap, a cover portion of the wrap is positioned over the mounting portion of the endless sling and the mounting portions of the positioning guide, free ends of the wrap overlap to form part of the cover portion, the free ends have fasteners to retain the cover portion in a closed position.

11. The hoist attachment as recited in claim 9, wherein a bottom portion of the wrap is attached to the second surface of the gripping pad.

12. The hoist attachment as recited in claim 9, wherein the positioning loops are positioned proximate to, but spaced from the sling protection portions of the protection pads.

13. The hoist attachment as recited in claim 12, wherein the sling protection portions of the protection pads are positioned between the positioning loops and a longitudinal axis of the hoist attachment.

14. The hoist attachment as recited in claim 13, wherein the endless sling extends from either side of the base member, each side of the endless sling extends from the base member through the positioning member, a first portion of the endless sling that extends between the base member and the positioning member is guided by the sling protection portions of the protection pads.

15. The hoist attachment as recited in claim 14, wherein a second portion of each side of the endless sling then extends from the positioning member to and around the positioning loops of the positioning guide.

16. The hoist attachment as recited in claim 15, wherein a third portion of each side of the endless sling extends from the positioning loops to a load mounting portion of the endless sling.

17. The hoist attachment as recited in claim 15, wherein the second and third portions of the endless sling have a wear pad.

18. The hoist attachment as recited in claim 6, wherein mounting portions of the positioning guide are positioned on a first surface of the mounting portion of the protection pad.

19. The hoist attachment as recited in claim 1, wherein the positioning member is a circular member.

20. The hoist attachment as recited in claim 1, wherein connection hardware is positioned in the load mounting portion.

* * * * *